(12) United States Patent
Amano et al.

(10) Patent No.: US 9,576,405 B2
(45) Date of Patent: Feb. 21, 2017

(54) FAILURE DETERMINATION DEVICE OF HYBRID VEHICLE AND ITS FAILURE DETERMINATION METHOD

(71) Applicants: JATCO Ltd, Shizuoka (JP); Nissan Motor Co., Ltd., Kanagawa (JP)

(72) Inventors: Norihira Amano, Shizuoka (JP); Hajime Tasaka, Seoul (JP)

(73) Assignees: JATCO Ltd, Shizuoka (JP); NISSAN MOTOR CO., LTD., Kanagawa (JP)

(*) Notice: Subject to any disclaimer, the term of this patent is extended or adjusted under 35 U.S.C. 154(b) by 0 days.

(21) Appl. No.: 14/895,269

(22) PCT Filed: Jun. 2, 2014

(86) PCT No.: PCT/JP2014/064581
§ 371 (c)(1),
(2) Date: Dec. 2, 2015

(87) PCT Pub. No.: WO2014/196492
PCT Pub. Date: Dec. 11, 2014

(65) Prior Publication Data
US 2016/0125670 A1 May 5, 2016

(30) Foreign Application Priority Data

Jun. 3, 2013 (JP) ................................. 2013-116835

(51) Int. Cl.
*B60L 9/00* (2006.01)
*B60L 11/00* (2006.01)
(Continued)

(52) U.S. Cl.
CPC ................ *G07C 5/08* (2013.01); *B60K 6/387* (2013.01); *B60K 6/46* (2013.01); *B60K 6/48* (2013.01); *B60K 6/543* (2013.01); *B60W 10/02* (2013.01); *B60W 20/00* (2013.01); *B60W 20/50* (2013.01); *B60W 30/18027* (2013.01); *F16D 48/06* (2013.01); *F16H 61/12* (2013.01); *F16H 61/662* (2013.01); *B60W 2510/0241* (2013.01); *B60W 2510/0275* (2013.01);
(Continued)

(58) Field of Classification Search
CPC ............. B60K 6/387; B60K 6/46; B60K 6/48; B60K 6/543; B60W 10/02; B60W 20/00; B60W 20/50; B60W 30/18027; F16D 48/06; F16H 61/12; F16H 61/662
USPC ......................................................... 701/22
See application file for complete search history.

(56) References Cited

FOREIGN PATENT DOCUMENTS

| JP | 2010-155590 A | 7/2010 |
|---|---|---|
| JP | 2012-090491 A | 5/2012 |

*Primary Examiner* — Maceeh Anwari
(74) *Attorney, Agent, or Firm* — Osha Liang LLP (57) ABSTRACT

A failure determination device of a hybrid vehicle, includes an engine, a motor arranged in series with the engine, a clutch arranged between the motor and a driving wheel, a pressure adjusting mechanism that adjusts hydraulic pressure supplied to the clutch, and that performs wet start clutch control for adjusting the hydraulic pressure, supplied to the clutch at least upon starting, to the hydraulic pressure causing the clutch to slip, and a controller configured to calculate required driving force on the basis of accelerator opening, and calculate torque capacity of the clutch, required for transmitting the required driving force by the clutch, as target torque capacity, calculate actual torque of the engine and actual torque of the motor, and calculate a torque deviation as a deviation between the target torque capacity and a sum of the actual torque of the engine and the actual torque of the motor.

7 Claims, 5 Drawing Sheets

(51) Int. Cl.
*G05D 1/00* (2006.01)
*G05D 3/00* (2006.01)
*G06F 7/00* (2006.01)
*G06F 17/00* (2006.01)
*G07C 5/08* (2006.01)
*B60K 6/48* (2007.10)
*B60K 6/543* (2007.10)
*B60W 10/02* (2006.01)
*B60W 20/00* (2016.01)
*F16H 61/12* (2010.01)
*F16H 61/662* (2006.01)
*B60K 6/387* (2007.10)
*B60W 30/18* (2012.01)
*B60K 6/46* (2007.10)
*F16D 48/06* (2006.01)

(52) U.S. Cl.
CPC .............. *B60W 2510/0657* (2013.01); *B60W 2510/083* (2013.01); *B60W 2710/025* (2013.01); *B60Y 2200/10* (2013.01); *B60Y 2300/42* (2013.01); *B60Y 2306/15* (2013.01); *B60Y 2400/42* (2013.01); *Y02T 10/6221* (2013.01); *Y10S 903/914* (2013.01); *Y10S 903/946* (2013.01)

FAILURE DETERMINATION DEVICE OF HYBRID VEHICLE AND ITS FAILURE DETERMINATION METHOD

CROSS-REFERENCE TO RELATED APPLICATIONS

The present application is a national stage application of PCT/JP2014/064581, filed Jun. 2, 2014, and claims priority to Japanese Patent Application No. 2013-116835 filed with the Japan Patent Office on Jun. 3, 2013, the contents of which are hereby incorporated by reference in their entirety.

BACKGROUND

Technical Field

The present invention relates to a technique of determining whether or not an engagement failure (MIN pressure fault) of a clutch is caused due to insufficient hydraulic pressure to be supplied to the clutch in a hybrid vehicle.

Related Art

JP2010-155590A discloses a hybrid vehicle in which an engine and a motor are arranged in series, and a first clutch and a second clutch are arranged between the engine and the motor and between the motor and a driving wheel, respectively.

With thus-structured hybrid vehicle, the vehicle travels in an EV mode by using the motor only, when a first clutch is released and a second clutch is engaged, and the vehicle travels in an HEV mode by using the engine and the motor, when the first clutch and the second clutch are engaged.

Upon starting or decelerating to stop, wet start clutch control is start and stop without depending on a torque converter.

SUMMARY OF INVENTION

In general, whether an engagement failure (MIN pressure fault) is caused in a clutch or not, due to insufficient hydraulic pressure to be supplied to the clutch, can be determined based on a rotation speed difference (difference between rotation speed of an input side element and rotation speed of an output side element) in the clutch. Namely, when the rotation speed difference is caused in the clutch under the situation where the clutch should be engaged as a select position is operated to a traveling position such as D or R, it is possible to determine that the engagement failure is caused in the clutch.

With the above-described hybrid vehicle, however, the second clutch is not fully engaged as it is in a slip state by the wet start clutch control, even though the select position is operated to the traveling position. For this reason, during the wet start clutch control, the rotation speed difference is caused even though the second clutch is in normal condition and, even when the engagement failure is caused in the second clutch, the rotation speed difference does not increase as racing of the engine is suppressed by regeneration of the motor. This makes it impossible to distinguish between the rotation speed difference by the wet start clutch control and the rotation speed difference by the engagement failure of the second clutch, and to properly make engagement failure determination of the clutch by the rotation speed difference only.

When a sensor or a switch for detecting the hydraulic pressure to be supplied to the second clutch is provided, the engagement failure determination of the clutch can be made based on the hydraulic pressure. In this case, however, it is necessary to provide the sensor or the switch for detecting the hydraulic pressure, thus causing a cost increase.

One or more embodiments of the present invention determines, even during the wet start clutch control, that the engagement failure (MIN pressure fault) is caused in the clutch, due to the insufficient hydraulic pressure to be supplied to the clutch in the hybrid vehicle that performs the wet start clutch control.

According to one or more embodiments of the present invention, a failure determination device of a hybrid vehicle including an engine and a motor arranged in series, a clutch arranged between the motor and a driving wheel, and a pressure adjusting mechanism for adjusting hydraulic pressure supplied to the clutch, and performing, by the pressure adjusting mechanism, wet start clutch control for adjusting the hydraulic pressure, supplied to the clutch at least upon starting, to the hydraulic pressure causing the clutch to slip, is provided. The failure determination device includes target torque capacity calculating means adapted to calculate required driving force on the basis of accelerator opening, and calculate torque capacity of the clutch, required for transmitting the required driving force by the clutch, as target torque capacity; actual torque calculating means adapted to calculate actual torque of the engine and actual torque of the motor; torque deviation calculating means adapted to calculate a torque deviation as a deviation between the target torque capacity and a sum of the actual torque of the engine and the actual torque of the motor; and failure determining means adapted to determine occurrence of an engagement failure of the clutch when the torque deviation becomes greater than a first fault determination value during the wet start clutch control.

According to one or more embodiments of the present invention, a corresponding failure determination method is provided.

According to one or more embodiments of the present invention, the engagement failure of the clutch can be determined (MIN pressure fault) can be determined even during the wet start clutch control and thus the engagement failure of the clutch can be determined at an early stage.

DETAILED DESCRIPTION

Hereinafter, embodiments of the present invention will be explained with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
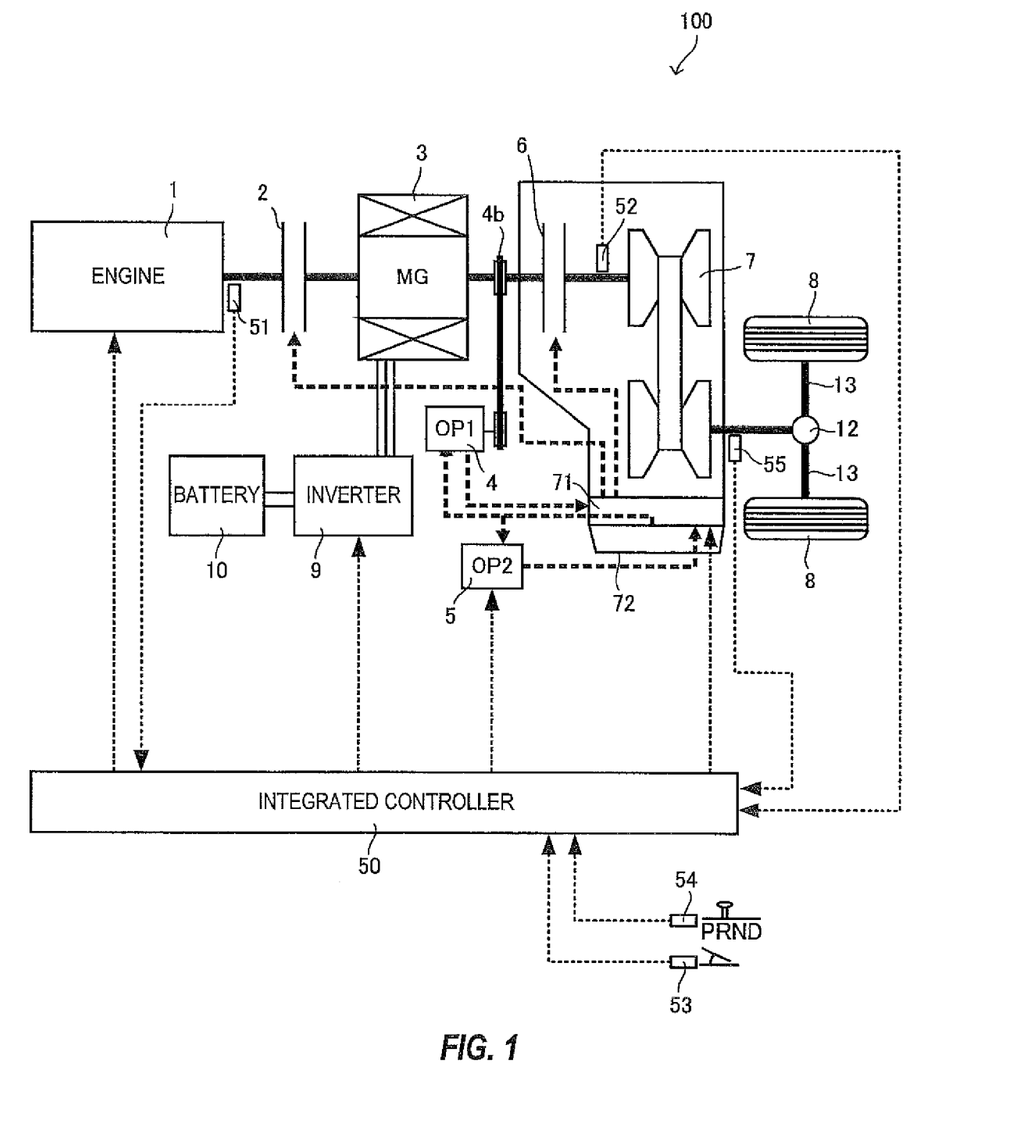
FIG. 1 is an overall block diagram of a hybrid vehicle, to which a failure determination device according to one or more embodiments of the present invention is applied.

FIG. 1 is an overall block diagram of a hybrid vehicle (hereinafter referred to as the vehicle) 100. The vehicle 100 is provided with an engine 1, a first clutch 2, a motor generator (hereinafter referred to as the MG) 3, a first oil pump 4, a second oil pump 5, a second clutch 6, a continuously variable transmission (hereinafter referred to as the CVT) 7, driving wheels 8, and an integrated controller 50.

The engine 1 is an internal combustion engine that uses gasoline, diesel oil or the like as fuel, and its rotation speed, torque and the like are controlled based on a command from the integrated controller 50.

The first clutch 2 is a normal-open hydraulic clutch that is interposed between the engine 1 and the MG 3. Based on a command from the integrated controller 50, a state of engagement/release of the first clutch 2 is controlled by hydraulic pressure, whose pressure is adjusted by a hydraulic control valve unit 71 by using discharge pressure from the first oil pump 4 or the second oil pump 5 as original pressure. A multi-plate dry clutch is used as the first clutch 2, for example.

The MG 3, arranged in series with the engine 1, is a synchronous rotary electric machine, in which permanent magnets are embedded in a rotor and a stator coil is wound around a stator. Based on a command from the integrated controller 50, the MG 3 is controlled by application of a three-phase current that is made by an inverter 9. The MG 3 may be operated as an electric motor that is rotatively driven by receiving supply of power from a battery 10. When the rotor receives rotational energy from the engine 1 and the driving wheels 8, the MG 3 may function as a power generator that causes electromotive force at both ends of the stator coil, and may charge the battery 10.

The first oil pump 4 is a vane pump that is operated by transmission of rotation of the MG 3 via a belt 4b. The first oil pump 4 sucks hydraulic oil stored in an oil pan 72 of the CVT 7, and supplies hydraulic pressure to the hydraulic control valve unit 71.

The second oil pump 5 is an electric oil pump that is operated by receiving supply of the power from the battery 10. Based on a command from the integrated controller 50, the second oil pump 5 is driven when oil quantity is not enough by the first oil pump 4 only and, similarly to the first oil pump 4, the second oil pump 5 sucks the hydraulic oil stored in the oil pan 72 of the CVT 7, and supplies the hydraulic pressure to the hydraulic control valve unit 71.

The second clutch 6 is interposed between the MG 3 and the CVT 7 and the driving wheels 8. Based on a command from the integrated controller 50, engagement/release of the second clutch 6 is controlled by the hydraulic pressure, whose pressure is adjusted by the hydraulic control valve unit 71 by using the discharge pressure from the first oil pump 4 or the second oil pump 5 as the original pressure. A normal-open multi-plate wet clutch is used as the second clutch 6, for example.

The CVT 7, arranged downstream of the MG 3, is able to change a speed ratio steplessly, according to vehicle speed, accelerator opening and the like. The CVT 7 is provided with a primary pulley, a secondary pulley, and a belt hung across the pulleys. The speed ratio is changed steplessly by generating primary pulley pressure and secondary pulley pressure by the hydraulic control valve unit 71, by using the discharge pressure from the first oil pump 4 and the second oil pump 5 as the original pressure, moving a movable pulley of the primary pulley and a movable pulley of the secondary pulley in the axial direction by using the pulley pressure, and changing a belt-pulley contact radius.

A differential 12 is connected to an output shaft of the CVT 7 via a not-illustrated final speed reduction gear mechanism, and the driving wheels 8 are connected to the differential 12 via drive shafts 13.

Signals from a rotation speed sensor 51 that detects a rotation speed Ne of the engine 1, a rotation speed sensor 52 that detects an input rotation speed Nin of the CVT 7 (=output rotation speed of the second clutch 6), an accelerator opening sensor 53 that detects an accelerator opening APO, an inhibitor switch 54 that detects a select position of the CVT 7 (state of a select lever or a select switch that switches among forward, backward, neutral and parking), a vehicle speed sensor 55 that detects a vehicle speed VSP and the like are inputted to the integrated controller 50. Based on these inputted signals, the integrated controller 50 performes various control of the engine 1, the MG 3 (the inverter 9), and the CVT 7.

Specifically, the integrated controller 50 calculates required driving force (driving force for realizing acceleration required by a driver) based on the accelerator opening APO and the vehicle speed VSP, and controls respective torque of the engine 1 and the MG 3 so as to realize the required driving force.

Further, the integrated controller 50 sets torque capacity of the second clutch 6, capable of transmitting the required driving force, to be target torque capacity, and controls hydraulic pressure to be supplied from the hydraulic control valve unit 71 to the second clutch 6 in such a manner that the torque capacity of the second clutch 6 becomes the target torque capacity.

Furthermore, the integrated controller 50 calculates a target speed ratio based on the accelerator opening APO and the vehicle speed VSP, and controls the speed ratio of the CVT 7 so that the target speed ratio is realized.

Figure 2:
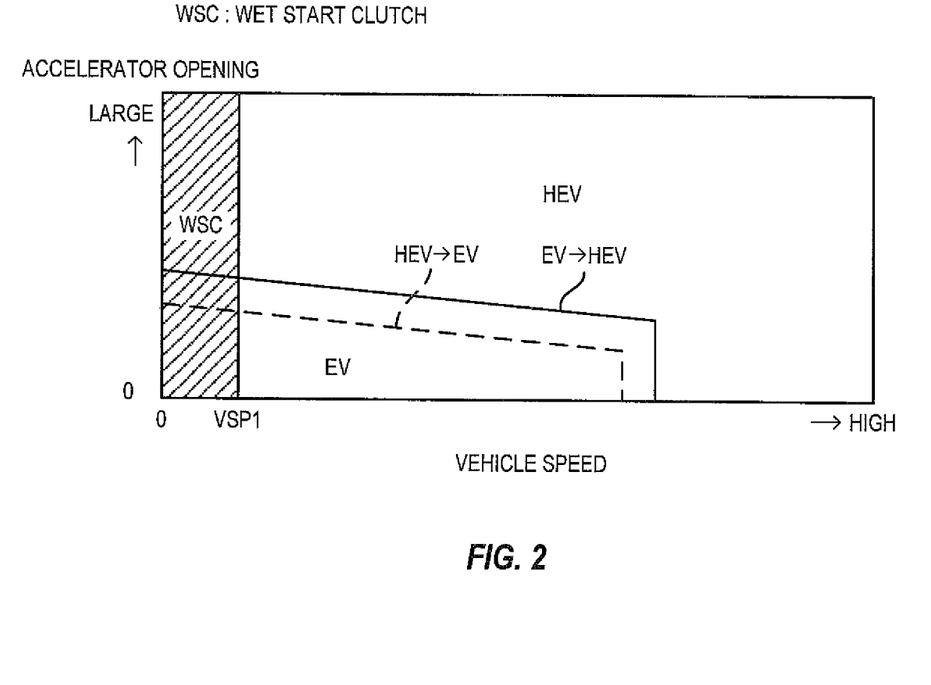
FIG. 2 is an example of a mode switching map.

Further, the integrated controller 50 refers to a mode switching map, as illustrated in FIG. 2, and switches between an EV mode and an HEV mode as an operation mode of the vehicle 100.

With the EV mode, the first clutch 2 is released and the vehicle 100 travels by using only the MG 3 as a driving source. The EV mode is selected when the required driving force is small and an SOC of the battery 10 is enough.

With the HEV mode, the first clutch 2 is engaged and the vehicle 100 travels by using the engine 1 and the MG 3 as the driving source. The HEV mode is selected when the required driving force is large or the SOC of the battery 10 is not enough.

In order to prevent hunting at the time of switching between the EV mode and the HEV mode, a switching line from the EV mode to the HEV mode is set on a higher vehicle speed side and on a larger accelerator opening side, as compared with a switching line from the HEV mode to the EV mode.

As the vehicle 100 is not provided with a torque converter, the integrated controller 50 performes wet start clutch control, by which the vehicle 100 is started and stopped while causing the second clutch 6 to slip, in a wet start clutch region as illustrated in FIG. 2 (in a low vehicle speed region where the vehicle speed to be used is VSP1 or less, at the time of start or deceleration to stop, wherein VSP1 is 10 km/h, for example).

Specifically, when the vehicle 100 starts by switching the select position of the CVT 7 from a non-traveling position such as N, P to a traveling position such as D, R, the integrated controller 50 gradually increases the hydraulic pressure to be supplied to the second clutch 6, and causes the second clutch 6 to slip and to be engaged gradually. When the vehicle speed reaches VSP1, the integrated controller 50 causes the second clutch 6 to be fully engaged, and finishes the wet start clutch control.

When the vehicle 100 travels while the select position of the CVT 7 is in the traveling position and when the vehicle 100 decelerates and its vehicle speed decreases to VSP1, the integrated controller 50 gradually decreases the hydraulic pressure to be supplied to the second clutch 6, and causes the second clutch 6 to slip and to be released gradually. When the vehicle 100 stops, the integrated controller 50 causes the second clutch 6 to be fully released, and finishes the wet start clutch control.

During the wet start clutch control, the integrated controller 50 controls the engine 1 and the MG 3 so that a rotation speed difference of the second clutch 6 becomes a target rotation speed difference.

When an engagement failure (MIN pressure fault) of the second clutch 6 is caused in the vehicle 100, due to insufficient hydraulic pressure to be supplied to the second clutch 6, there is a possibility of a reduction in line pressure as its origin and, when the line pressure is reduced, there is a possibility of a belt slip in the CVT 7. For this reason, when the engagement failure of the second clutch 6 is caused, it is necessary to promptly determine the engagement failure and to perform proper control such as torque-down of the engine 1 and the MG 3.

However, during the wet start clutch control, the second clutch 6 is in the slip state, as described above, and the rotation speed difference is caused in the second clutch 6 during the wet start clutch control, irrespective of whether the engagement failure of the second clutch 6 is caused or not. This makes it difficult to determine whether or not the engagement failure of the second clutch is caused based on the rotation speed difference only.

For this reason, with the vehicle 100, the determination whether the engagement failure of the second clutch 6 is caused or not is made by fault determination processing as will be described below.

Figure 3:
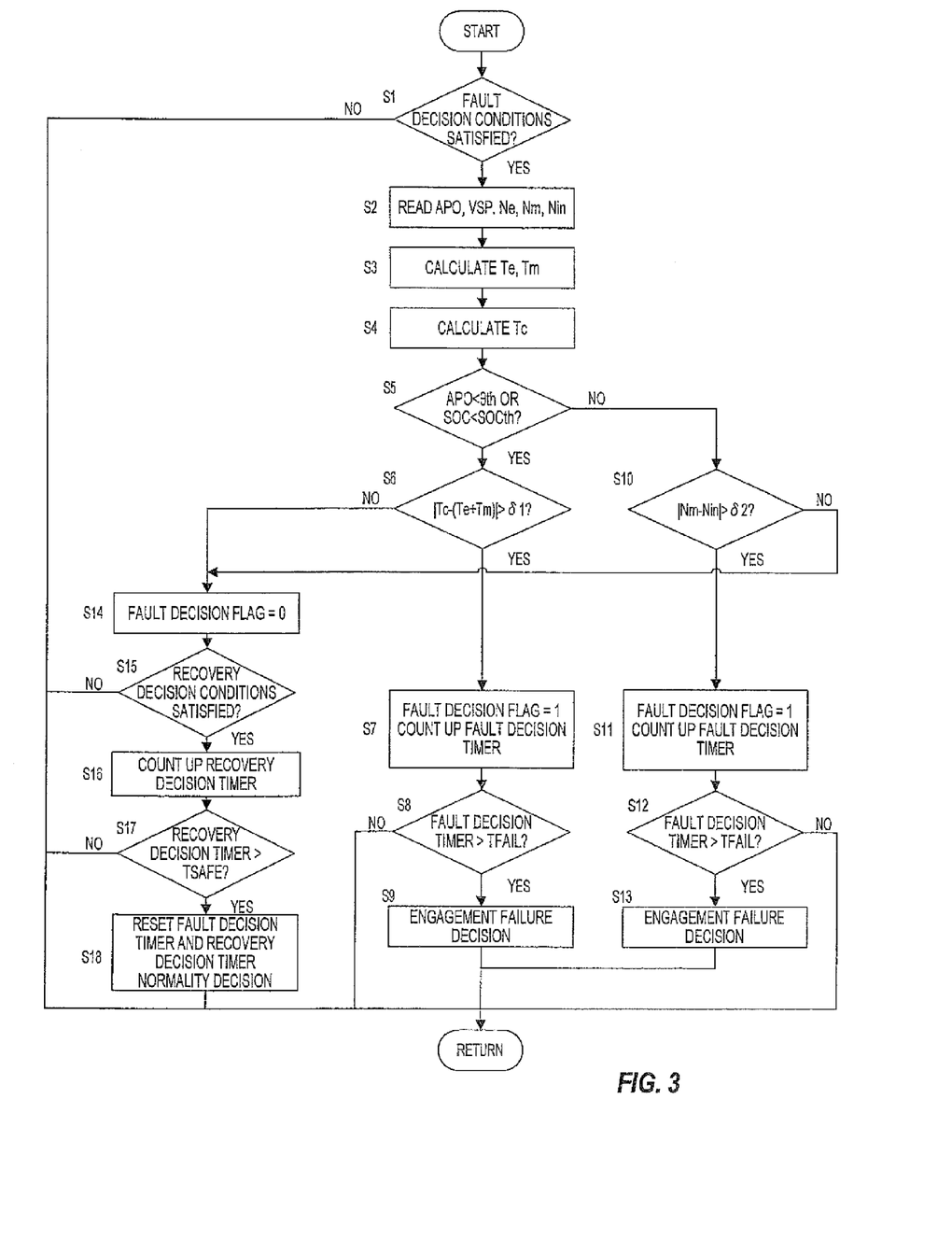
FIG. 3 is a flowchart illustrating the details of fault determination processing.

FIG. 3 is a flowchart illustrating the details of the fault determination processing of the second clutch 6, executed by the integrated controller 50.

Specifically, in S1, the integrated controller 50 first determines whether or not fault determination conditions are satisfied. It is determined that the fault determination conditions are satisfied when the select position of the CVT 7 is in a travelling position such as D and R, the accelerator opening is greater than 0, the operation mode is not being switched, the select position is not being changed, and a failure of the sensors and the like is not detected. The processing proceeds to S2 when the fault determination conditions are satisfied, otherwise the processing is ended.

In S2, the integrated controller 50 reads the accelerator opening APO, the vehicle speed VSP, the rotation speed Ne of the engine 1, a rotation speed Nm of the MG 3, and the input rotation speed Nin of the CVT 7. The accelerator opening APO, the vehicle speed VSP, the rotation speed Ne of the engine 1, and the input rotation speed Nin of the CVT 7 are the values detected by the sensors, and the rotation speed Nm of the MG 3 is the value calculated by a control signal of the MG 3.

In S3, the integrated controller 50 calculates an actual torque Te of the engine 1 and an actual torque Tm of the MG 3. The actual torque Te of the engine 1 can be calculated by referring to a torque map of the engine 1, based on the accelerator opening APO and the rotation speed Ne of the engine 1. The actual torque of the MG 3 can be calculated based on an electric load (current value) of the MG 3.

In S4, the integrated controller 50 calculates a target torque capacity Tc of the second clutch 6. The target torque capacity Tc is the torque capacity of the second clutch 6 that is required for transmitting the required driving force, calculated based on the accelerator opening APO and the vehicle speed VSP, and can be calculated based on the required driving force.

In S5, the integrated controller 50 determines whether or not racing of the engine 1, at the time of the engagement failure of the second clutch 6, can be suppressed by regeneration of the MG 3. Whether the racing of the engine 1 can be suppressed or not depends on the actual torque of the engine 1 and regenerative capability of the MG 3, and it is determined that the racing of the engine 1 can be suppressed by the regeneration of the MG 3 when the accelerator opening APO is smaller than a predetermined opening APOth, or when the SOC of the battery 10 is smaller than a predetermined value SOCth.

The processing proceeds to S6 when it is determined that the racing of the engine 1 can be suppressed by the regeneration of the MG 3, and when it is determined that the racing of the engine 1 cannot be suppressed, the processing proceeds to S10.

In S6, the integrated controller 50 calculates an absolute value of a deviation (hereinafter referred to as the "torque deviation") between the target torque capacity Tc of the second clutch 6 and a sum of the actual torque Te of the engine 1 and the actual torque Tm of the MG 3 (=actual input torque of the CVT 7), and determines whether or not it is greater than a first fault determination value $\delta 1$.

When the engagement failure is caused in the second clutch 6, the regeneration by the MG 3 is performed so that the rotation speed difference in the second clutch 6 does not become greater than the target rotation speed difference, and the torque of the MG 3 becomes a negative value, as a result of which the torque inputted from the engine 1 and the MG 3 to the second clutch 6 decreases, and the torque deviation increases.

Therefore, when the torque deviation is greater than the first fault determination value $\delta 1$, the integrated controller 50 determines that there is a possibility of the engagement failure caused in the second clutch 6, and the processing proceeds to S7. Otherwise, the processing proceeds to S14.

In S7, the integrated controller 50 sets a fault determination flag as 1, and causes a fault determination timer to count up. The fault determination timer is the timer for measuring a period of time during when the torque deviation is greater than the first fault determination value $\delta 1$.

In S8, the integrated controller 50 determines whether or not the value of the fault determination timer becomes greater than a fault determination threshold value TFAIL. When the value of the fault determination timer is greater than the fault determination threshold value TFAIL, the processing proceeds to S9, where the integrated controller 50 determines that the engagement failure is caused in the second clutch 6. When the value of the fault determination timer is not greater than the fault determination threshold value TFAIL, the processing is ended.

It is not immediately determined that the engagement failure is caused in the second clutch 6 when the torque deviation becomes greater than the first fault determination value $\delta 1$ because the torque deviation becomes greater than the first fault determination value $\delta 1$ temporarily even in a state in which the second clutch 6 is not engaged due to an operation delay of the hydraulic control valve unit 71 even though the select position is in the travelling position and the integrated controller 50 recognizes the travelling position (a pseudo D state), so that it is necessary to distinguish between such a pseudo D state and the engagement failure of the second clutch 6.

Meanwhile, in S10, proceeded from 55 where such determination is made that the racing of the engine 1 cannot be suppressed by the regeneration of the MG 3, the integrated controller 50 calculates the rotation speed difference of the second clutch 6 based on the rotation speed Nm of the MG 3 and the input rotation speed Nin of the CVT 7, and determines whether or not it is greater than a second fault determination value δ2.

When the engagement failure is caused in the second clutch 6, the regeneration by the MG 3 is performed so that the rotation speed difference in the second clutch 6 does not become greater than the target rotation speed difference, as described above. However, when the racing of the engine 1 cannot be suppressed by the regeneration of the MG 3 as the accelerator opening APO is large, or when the racing of the engine 1 cannot be suppressed by the regeneration of the MG 3 as the SOC of the battery 10 is high and the regeneration by the MG 3 cannot be performed sufficiently, the racing of the engine 1 is caused, which makes it difficult to determine, by the above-described torque deviation, whether or not the engagement failure is caused in the second clutch 6.

In this case, therefore, the determination of the engagement failure in the second clutch 6 is made based on the rotation speed difference in the second clutch 6. The processing proceeds to S11 when the rotation speed difference is greater than a second fault determination value δ2 because there is a possibility of the engagement failure in the second clutch 6. Otherwise, the processing proceeds to S14.

The processing of S11 to S13 is the same as the processing of S7 to S9, where the fault determination flag is set as 1 and the fault determination timer is caused to count up. When the value of the fault determination timer becomes greater than the fault determination threshold value TFAIL, such determination is made that the engagement failure is caused in the second clutch 6.

Meanwhile, when it is determined in S6 that the torque deviation is smaller than the first fault determination value δ1, and when it is determined in S10 that the rotation speed difference is smaller than the second fault determination value δ2, the processing proceeds to S14, where the integrated controller 50 sets the fault determination flag as 0.

In S15, the integrated controller 50 determines whether or not recovery determination conditions are satisfied. It is determined that the recovery determination conditions are satisfied when either one of the following two conditions is satisfied:

Torque deviation<first recovery determination value Δ1, and rotation speed difference<second recovery determination value Δ2;

Accelerator opening APO>0, and rotation speed difference≈0.

When it is determined that the recovery determination conditions are satisfied, the processing proceeds to S16, where a recovery determination timer is caused to count up.

In S17, the integrated controller 50 determines whether or not the recovery determination timer becomes greater than a recovery determination threshold value TSAFE. When it is determined that the recovery determination timer is greater than the recovery determination threshold value TSAFE, the processing proceeds to S18, where the integrated controller 50 resets the fault determination timer and the recovery determination timer and determines that the second clutch 6 is in normal condition.

Figure 4:
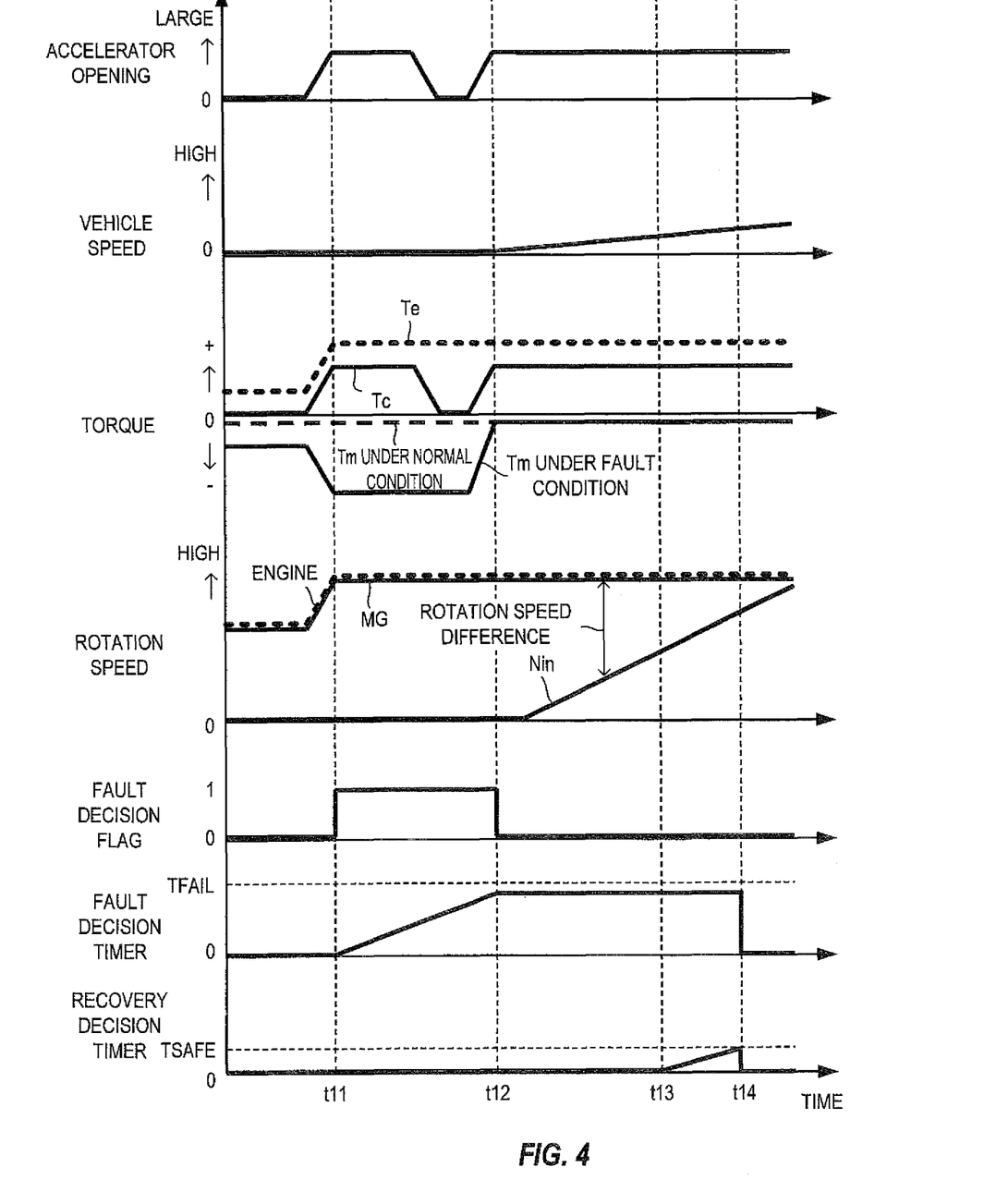
FIG. 4 is a time chart illustrating the state where engagement failure determination of a second clutch is made.

FIG. 4 illustrates the case where the failure determination of the second clutch 6 is made at the time when an accelerator pedal is depressed to start the vehicle. In this case, the accelerator pedal is depressed twice and at the first depression, the hydraulic pressure is not supplied to the second clutch 6.

Therefore, at times t11 to t12, the regeneration by the MG 3 is performed so as to suppress the increase in the rotation speed difference and, when the torque of the MG 3 becomes negative, the torque deviation (deviation between the target torque capacity Tc of the second clutch 6 and the sum of the actual torque Te of the engine 1 and the actual torque Tm of the MG 3) increases, and the fault determination flag is set as 1.

During this period, the fault determination timer is caused to count up, but it is not determined in this case that the engagement failure is caused in the second clutch 6, as the torque deviation decreases before the value of the fault determination timer reaches the fault determination threshold value TFAIL, and the fault determination flag is set as 0.

At the time of the second depression, the hydraulic pressure is normally supplied to the second clutch 6, and the wet start clutch control is performed normally.

As the regeneration by the MG 3 is not performed during the wet start clutch control, the torque deviation is smaller than the first recovery determination value Δ1, and the rotation speed difference in the second clutch 6 decreases, as the wet start clutch control progresses, to be smaller than the second recovery determination value Δ2 at a time t13.

When this state continues for a predetermined period of time (a period of time until the recovery determination timer reaches the recovery determination threshold value TSAFE), the fault determination timer and the recovery determination timer are reset (time t14).

Figure 5:
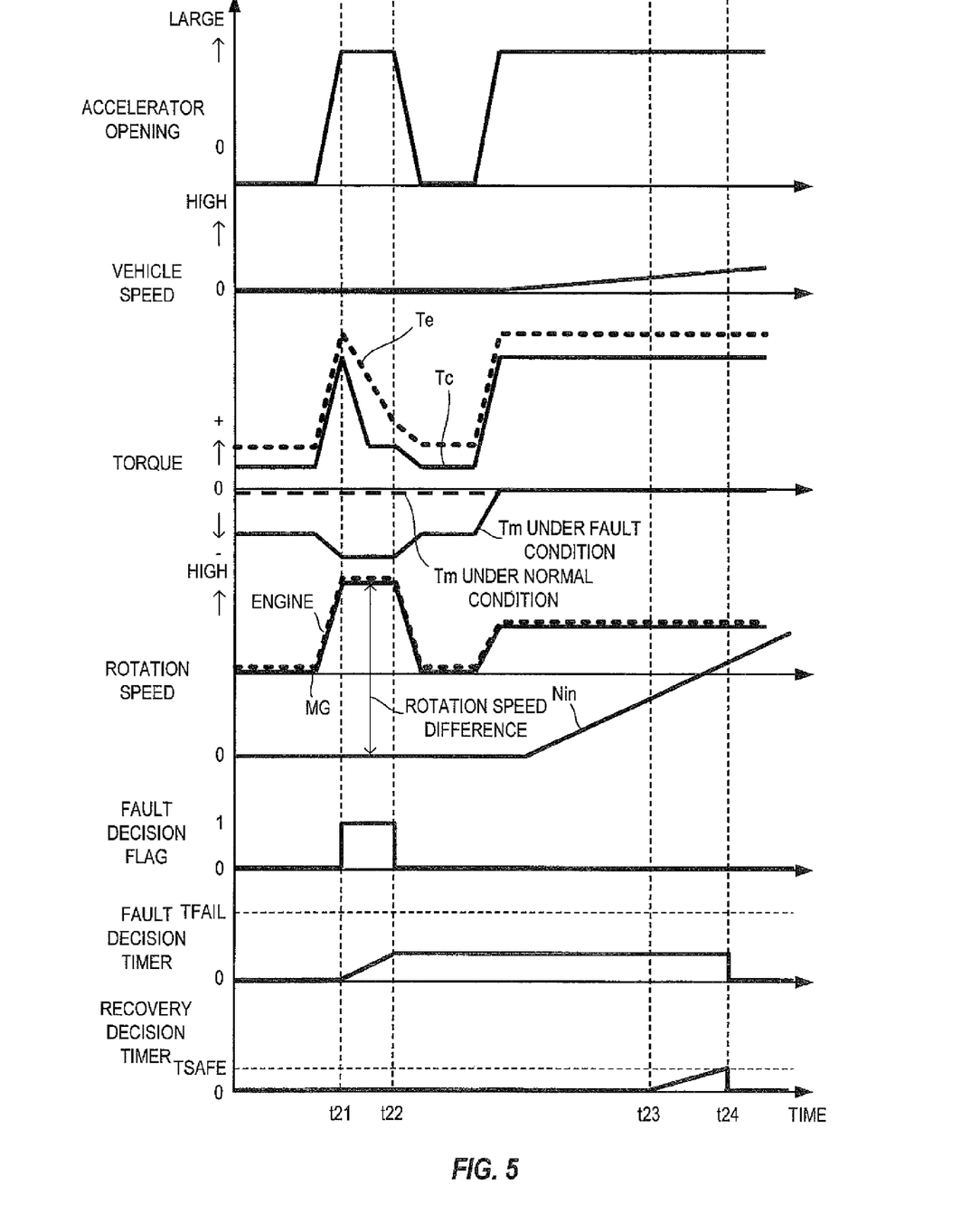
FIG. 5 is a time chart illustrating the state where the engagement failure determination of the second clutch is made when motor regeneration is not enough.

Further, FIG. 5 illustrates the case where the failure determination of the second clutch 6 is made at the time when the accelerator pedal is deeply depressed to start the vehicle. In this case, the accelerator pedal is depressed twice, and at the first depression, the hydraulic pressure is not supplied to the second clutch 6.

At times t21 to t22, the rotation speed difference in the second clutch 6 increases and the fault determination flag becomes 1. During this period, the fault determination timer is caused to count up, but it is not determined in this case that the engagement failure is caused in the second clutch 6, as the torque deviation decreases before the value of the fault determination timer reaches the fault determination threshold value TFAIL, and the fault determination flag is set as 0.

At the time of the second depression, the hydraulic pressure is normally supplied to the second clutch 6, and the wet start clutch control is performed normally.

As the regeneration by the MG 3 is not performed during the wet start clutch control, the torque deviation is smaller than the first recovery determination value Δ1, and the rotation speed difference in the second clutch 6 decreases, as the wet start clutch control progresses, to be smaller than the second recovery determination value Δ2 at a time t23.

When this state continues for a predetermined period of time (a period of time until the recovery determination timer reaches the recovery determination threshold value TSAFE), the fault determination timer and the recovery determination timer are reset (time t24).

Therefore, according to the above-described fault determination processing, the engagement failure determination of the second clutch 6 can be made based on the torque deviation, even during the wet start clutch control after the operation of the select position from the non-traveling position to the traveling position. Thus, the engagement failure determination of the second clutch 6 can be made at an early stage, and the proper control such as the torque-down of the engine 1 and the MG 3 can be started.

In the case where the racing of the engine 1, due to the engagement failure by the second clutch 6, cannot be suppressed by the regeneration of the MG 3, because the degree of the racing of the engine 1 is great due to a large amount of the depressed accelerator pedal, sufficient regeneration cannot be performed due to the high SOC of the battery 10 and the like, the engagement failure determination of the second clutch 6 is made based on the rotation speed difference of the second clutch 6. This makes it possible to determine the engagement failure in the second clutch 6 even when the racing of the engine 1 is caused and the engagement failure determination of the second clutch 6 by the above-described torque deviation is difficult.

Further, as the engagement failure determination of the second clutch 6 is made when an accumulated value of the period of time, during when the conditions to be referred to in the engagement failure determination of the second clutch 6 are satisfied, reaches the predetermined value, it is possible to improve accuracy of the failure determination. Especially, it is possible to prevent the case where the second clutch 6 is not engaged temporarily, such as the pseudo D, from being erroneously determined that the engagement failure of the second clutch 6 is caused.

Furthermore, the accumulated value is reset under the situations where it is possible to determine that the second clutch 6 is in normal condition, such as when the accelerator pedal is depressed and the rotation speed difference in the second clutch 6 is approximately zero, and when, during the wet start clutch control, the torque deviation is smaller than the first recovery determination value Δ1, and the rotation speed difference in the second clutch 6 is smaller than the second recovery determination value Δ2.

Thus, even though the engagement failure of the second clutch 6 is caused temporarily, it is possible to determine that the second clutch 6 is in normal condition when the engagement failure recovers after that. This makes it possible to prevent the torque-down and the like of the engine 1 and the MG 3 from being performed unnecessarily.

Embodiments of the present invention are explained above. However, the above-described embodiments are merely examples of the present invention, and are not intended to limit the technical scope of the present invention to the concrete structures of the above-described embodiments.

For example, according to one or more the above-described embodiments, the vehicle 100 is provided with the CVT 7 as the transmission. Instead of the CVT 7. However, according to one or more embodiments of the claimed invention, other types of transmission (step AT, toroidal CVT, 2-pedal MT or the like) may be provided.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A failure determination device of a hybrid vehicle, comprising:
    an engine;
    a motor arranged in series with the engine;
    a clutch arranged between the motor and a driving wheel;
    a pressure adjusting mechanism that adjusts hydraulic pressure supplied to the clutch, and that performs wet start clutch control for adjusting the hydraulic pressure, supplied to the clutch at least upon starting, to the hydraulic pressure causing the clutch to slip; and
    a controller configured to:
        calculate required driving force on the basis of accelerator opening, and calculate torque capacity of the clutch, required for transmitting the required driving force by the clutch, as target torque capacity,
        calculate actual torque of the engine and actual torque of the motor,
        calculate a torque deviation as a deviation between the target torque capacity and a sum of the actual torque of the engine and the actual torque of the motor, and
        determine occurrence of an engagement failure of the clutch when the torque deviation becomes greater than a first fault determination value during the wet start clutch control.

2. The failure determination device according to claim 1, wherein, when racing of the engine cannot be suppressed by regeneration of the motor upon occurrence of the engagement failure of the clutch occurs, the controller determines the occurrence of the engagement failure of the clutch when a rotation speed difference in the clutch becomes greater than a second fault determination value during the wet start clutch control.

3. The failure determination device according to claim 1, wherein the controller accumulates a period of time, during when conditions to be referred to in the engagement failure determination of the clutch are satisfied, and determines the occurrence of the engagement failure of the clutch when an accumulated value reaches a predetermined value.

4. The failure determination device according to claim 3, wherein the controller resets the accumulated value when an accelerator pedal is depressed and the rotation speed difference in the clutch is approximately zero.

5. The failure determination device according to claim 3, wherein the controller resets the accumulated value when the torque deviation is smaller than the first recovery determination value and the rotation speed difference in the clutch is smaller than the second recovery determination value, during the wet start clutch control.

6. A failure determination method of a hybrid vehicle comprising:
    adjusting via a pressure adjusting mechanism hydraulic pressure supplied to a clutch arranged between a motor and a driving wheel;
    performing, by the pressure adjusting mechanism, wet start clutch control for adjusting the hydraulic pressure, supplied to the clutch at least upon starting, to the hydraulic pressure causing the clutch to slip;
    calculating required driving force on the basis of accelerator opening, and calculating torque capacity of the clutch, required for transmitting the required driving force by the clutch, as target torque capacity;
    calculating actual torque of an engine arranged in series with the motor and actual torque of the motor;
    calculating a torque deviation as a deviation between the target torque capacity and a sum of the actual torque of the engine and the actual torque of the motor; and determining occurrence of an engagement failure of the clutch when the torque deviation becomes greater than a first fault determination value during the wet start clutch control.

7. A failure determination device of a hybrid vehicle comprising:
- an engine;
- a motor arranged in series with the engine;
- a clutch arranged between the motor and a driving wheel;
- a pressure adjusting means for adjusting hydraulic pressure supplied to the clutch, and performing, by the pressure adjusting means, wet start clutch control for adjusting the hydraulic pressure, supplied to the clutch at least upon starting, to the hydraulic pressure causing the clutch to slip;
- target torque capacity calculating means for calculating required driving force on the basis of accelerator opening, and calculating torque capacity of the clutch, required for transmitting the required driving force by the clutch, as target torque capacity;
- actual torque calculating means for calculating actual torque of the engine and actual torque of the motor;
- torque deviation calculating means for calculating a torque deviation as a deviation between the target torque capacity and a sum of the actual torque of the engine and the actual torque of the motor; and
- failure determining means for determining occurrence of an engagement failure of the clutch when the torque deviation becomes greater than a first fault determination value during the wet start clutch control.

* * * * *